US006791458B2

(12) United States Patent
Baldwin

(10) Patent No.: US 6,791,458 B2
(45) Date of Patent: Sep. 14, 2004

(54) DUAL TECHNOLOGY OCCUPANCY SENSOR AND METHOD FOR USING THE SAME

(75) Inventor: John R. Baldwin, Newtown, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/861,866

(22) Filed: May 22, 2001

(65) Prior Publication Data

US 2002/0175815 A1 Nov. 28, 2002

(51) Int. Cl.[7] .............................................. G08B 19/00
(52) U.S. Cl. ....................... 340/522; 340/521; 340/552; 340/555
(58) Field of Search ................................. 340/522, 521, 340/552, 553, 554, 565, 567, 541, 555, 556; 307/116, 117, 139; 342/28, 53, 173, 22, 27

(56) References Cited

U.S. PATENT DOCUMENTS

| 4,833,450 | A | * | 5/1989 | Buccola et al. ............. 340/506 |
| 4,874,962 | A | | 10/1989 | Hermans ..................... 307/116 |
| 5,019,802 | A | * | 5/1991 | Brittain et al. .............. 340/506 |
| 5,077,548 | A | * | 12/1991 | Dipoala ....................... 340/506 |
| 5,189,393 | A | | 2/1993 | Hu .............................. 340/522 |
| 5,331,308 | A | * | 7/1994 | Buccola et al. ............. 340/522 |
| 5,450,062 | A | * | 9/1995 | DiPoala ....................... 340/521 |
| 5,619,185 | A | | 4/1997 | Ferraro ........................ 340/568 |
| 5,699,243 | A | | 12/1997 | Eckel et al. ................. 364/140 |
| 5,763,872 | A | | 6/1998 | Ness ....................... 250/214 AL |
| 5,777,837 | A | | 7/1998 | Eckel et al. ................. 361/160 |
| 5,821,642 | A | | 10/1998 | Nishhira et al. ............. 307/127 |
| 5,856,905 | A | | 1/1999 | Eckel et al. ................. 361/187 |
| 5,867,099 | A | | 2/1999 | Keeter ......................... 340/567 |
| 5,936,524 | A | * | 8/1999 | Zhevelev et al. ............ 340/552 |
| 5,946,209 | A | | 8/1999 | Eckel et al. ................. 364/143 |
| 5,971,597 | A | | 10/1999 | Baldwin et al. ........ 364/528.12 |
| 5,984,513 | A | | 11/1999 | Baldwin ................. 364/528.21 |
| 6,127,926 | A | * | 10/2000 | Dando ......................... 340/541 |
| 6,151,529 | A | | 11/2000 | Batko ........................... 700/28 |
| 6,239,736 | B1 | * | 5/2001 | McDonald et al. .......... 340/554 |
| 6,285,912 | B1 | * | 9/2001 | Ellison et al. ................ 700/11 |
| 6,359,582 | B1 | * | 3/2002 | NacAleese et al. ........... 342/22 |
| 6,388,399 | B1 | * | 5/2002 | Eckel et al. ................. 315/312 |
| 6,415,205 | B1 | * | 7/2002 | Myron et al. ................ 340/522 |

OTHER PUBLICATIONS

Web site describing Sentrol 2T70 and 2T100 Dudal Technology Sensors.
Web site describing Sentrol 2T360 Dual Technology Sensor.
Web site describing Sentrol 2T40 Dual Technology Sensor.

* cited by examiner

Primary Examiner—Van T. Trieu
(74) Attorney, Agent, or Firm—Mark S. Bicks; Peter Kendall; Alfred N. Goodman

(57) ABSTRACT

A dual technology motion or occupancy sensor, and a method for using the same, to control a lighting circuit to activate and deactivate lights in a monitored area. The sensor employs an infrared energy sensor, a microwave energy sensor, and a controller. The infrared energy sensor outputs an infrared energy detection signal indicative of detection or non-detection of infrared energy, and the microwave energy sensor outputs a microwave energy detection signal indicative of detection or non-detection of microwave energy. The controller outputs a control signal to control activation and deactivation of the lighting circuit in response to a condition of the infrared energy detection signal and a condition of the microwave energy detection signal. Specifically, the controller activates the lighting circuit to turn on the lights in the monitored area when the infrared energy detection signal and microwave energy detection signal indicate occupancy or motion in the monitored area, and maintains the lights in the active state as long as either the microwave energy sensor or the infrared energy sensor sense occupancy or motion in the monitored area.

24 Claims, 2 Drawing Sheets

DUAL TECHNOLOGY OCCUPANCY SENSOR AND METHOD FOR USING THE SAME

BACKGROUND OF THE INVENTION

1. Field of the Invention

The present invention relates to a sensor device employing passive infrared and microwave sensor technology, and a method for using the same. More particularly, the present invention relates to a method and apparatus employing a motion or occupancy sensor which includes a passive infrared sensor and microwave sensor in conjunction with logic circuitry to control activation and deactivation of devices such as lighting circuits.

2. Description of the Related Art

Motion sensor switches, such as Model 1WS-ZP-M and Model 1WS-ZP-277V motion sensor switches manufactured by Hubbell, Inc., include a motion sensor, such as a passive infrared detector (PIR), and an ambient light level sensor, such as a photocell. Other motion sensor switches are described in U.S. Pat. Nos. 5,821,642 to Nishihira et al., 5,699,243 to Eckel et al., and 4,874,962 to Hermans, the entire contents of each being incorporated herein by reference.

Motion sensor switches of this type can be used, for example, as an occupancy detector which shuts off lights in a room when the sensor detects that no one is present in the room, and turns on the lights in the room when a person enters the room. A motion sensor switch also can be used, for example, as a motion sensor for an alarm system.

During operation, the motion sensor of the motion sensor switch monitors an area, such as an office, conference room in a building, or a home, for the presence of movement. Specifically, the motion sensor detects a change in the infrared energy radiating from regions in the area monitored by different sensing lobes of the PIR detector, which generally have a pass band within the 8–14 µm infrared range. If a person enters the monitored area, the person changes the amount of infrared energy being detected by the PIR detector. Therefore, the magnitude of the signal output by PIR detector, which is representative of the amount of detected infrared energy, will change. A motion sensor circuit in the motion sensor switch processes this signal, and provides a signal to a controller indicating that the amount of infrared energy received by the infrared detector has changed.

The controller interprets the signal provided by the motion sensor circuit, along with the signal provided by ambient light level sensor. If the signal provided by ambient light level sensor indicates that the ambient light in the monitored area is low (e.g., very little natural light is present in the monitored area), the control circuit will turn on or increase the brightness of the lights in the monitored area. However, if the signal provided by ambient light level sensor indicates that the ambient light in the monitored area is sufficient (e.g., due to sunlight, etc.), the control circuit may not turn on or brighten the lights, or may only brighten the lights slightly. In either event, control of the lights is based on the signals provided by the motion sensor and ambient light level sensor.

Motion sensor switches of this type also typically include a delay timing adjustment device, such as a potentiometer, which can be manually adjusted to set the delay time during which the lights should remain on after all occupants have left the monitored area. For example, if the delay timing adjustment device is adjusted to a 30-second setting, when all occupants leave and remain out of the monitored area for a period of time exceeding 30 seconds, the circuit of the motion sensor turns off the lighting load in the monitored area to conserve energy.

The motion sensor switches described above which employ only a PIR detector are generally suitable for their intended purpose. However, because PIR detectors detect infrared energy, these types of sensors can be susceptible to false triggering by other devices in the monitored area, such as computers, heating vents, and the like, that emit infrared energy.

In an attempt to minimize these false triggerings, a sensor has been developed that uses a PIR detector in conjunction with an ultrasonic detector. An example of a sensor employing PIR and ultrasonic detector technologies is described in U.S. Pat. No. 5,189,393 to Hu, the entire content of which is incorporated herein by reference. As can be appreciated by one skilled in the art, an ultrasonic sensor detects movement of an object. Accordingly, a sensor employing a PIR detector and an ultrasonic detector can include logic circuitry which requires detection of heat and movement in the monitored area to provide a switching signal to, for example, activate a lighting circuit.

Although a sensor employing both PIR and ultrasonic detector technology may be more accurate than a sensor employing only a PIR detector or only an ultrasonic detector, this type of sensor does have certain disadvantages. For example, ultrasonic detectors are sensitive to air movements such as air turbulence. Therefore, if a sensor employing an ultrasonic detector is used to monitor a room in a building, the air flow from the ventilation system of the building can cause a false triggering of the detector. Moreover, ultrasonic detectors are also sensitive to acoustic noise. Hence, noisy vehicles such as street sweepers and the like operating outside the building can cause false triggering of the ultrasonic detectors in the sensors in the building.

Other types of dual technology sensors are known for use in burglar alarm systems. For example, a Sentrol™ Model 2T40 motion sensor employs a microwave sensor technology, such as microwave impulse radar (MIR) technology and PIR technology. However, although it is necessary for these types of burglar alarm systems to accurately detect when an intruder has initially entered a monitored area to signal an alarm, it is not necessary for these types of systems to detect with extreme accuracy the continued presence of the intruder in the monitored area, or to detect when the intruder has left the monitored area. Therefore, these types of detectors have not been employed in conjunction with circuitry suitable for use as lighting control circuitry.

Accordingly, a need exists for an improved dual technology sensor which is capable for use as an efficient and accurate motion sensor for controlling lighting circuitry and does not suffer from the disadvantages of conventional sensors.

SUMMARY OF THE INVENTION

An object of the present invention is to provide an accurate and reliable dual technology motion or occupancy sensor.

Another object of the present invention is to provide a motion or occupancy sensor including a PIR sensor and a microwave sensor.

A further object of the present invention is to provide a method of using a dual technology motion or occupancy sensor, such as a motion or occupancy sensor including a PIR sensor and a microwave sensor.

These and other objects of the present invention are substantially achieved by providing a sensor and method for controlling a lighting circuit in a monitored area, employing an infrared energy sensor, a microwave energy sensor, and a controller. The infrared energy sensor is adapted to output an infrared energy detection signal indicative of detection or non-detection of infrared energy, and the microwave energy sensor is adapted to output a microwave energy detection signal indicative of detection or non-detection of microwave energy. The controller is adapted to output a control signal to control activation and deactivation of the lighting circuit in response to a condition of the infrared energy detection signal and a condition of the microwave energy detection signal.

Specifically, when the controller is controlling the lighting circuit to be in an inactive state and determines based on the infrared energy detection signal and microwave energy detection signal that the monitored area has become occupied, the controller activates the lighting circuit to turn the lights in the monitored area on. The controller maintains the lights in the on condition as long as the infrared energy detection signal or the microwave energy detection signal indicate that the monitored area is occupied. However, when both the infrared energy detection signal and the microwave energy detection signal indicate to the controller that the monitored area has been unoccupied for a period of time, the controller deactivates the lighting circuit to turn the lights in the monitored area off. The controller can determine the conditions of the microwave and infrared energy detection signals as indicating occupancy or vacancy of the monitored area by comparing the signals to respective threshold levels that the controller can calibrate as appropriate. The controller can also be configured to deactivate the lighting circuit that is in the active state when either the microwave energy detection signal or the infrared energy detection signal fails to indicate detection of occupancy in the monitored area for a period of time. The controller can also perform filtering on the microwave and infrared energy signals to avoid erroneous occupancy detection.

BRIEF DESCRIPTION OF THE DRAWINGS

These and other objects, advantages and novel features of the invention will be more readily appreciated from the following detail description when read in conjunction with the accompanying drawings, in which.

DETAILED DESCRIPTION OF THE PREFERRED EMBODIMENTS

Figure 1:
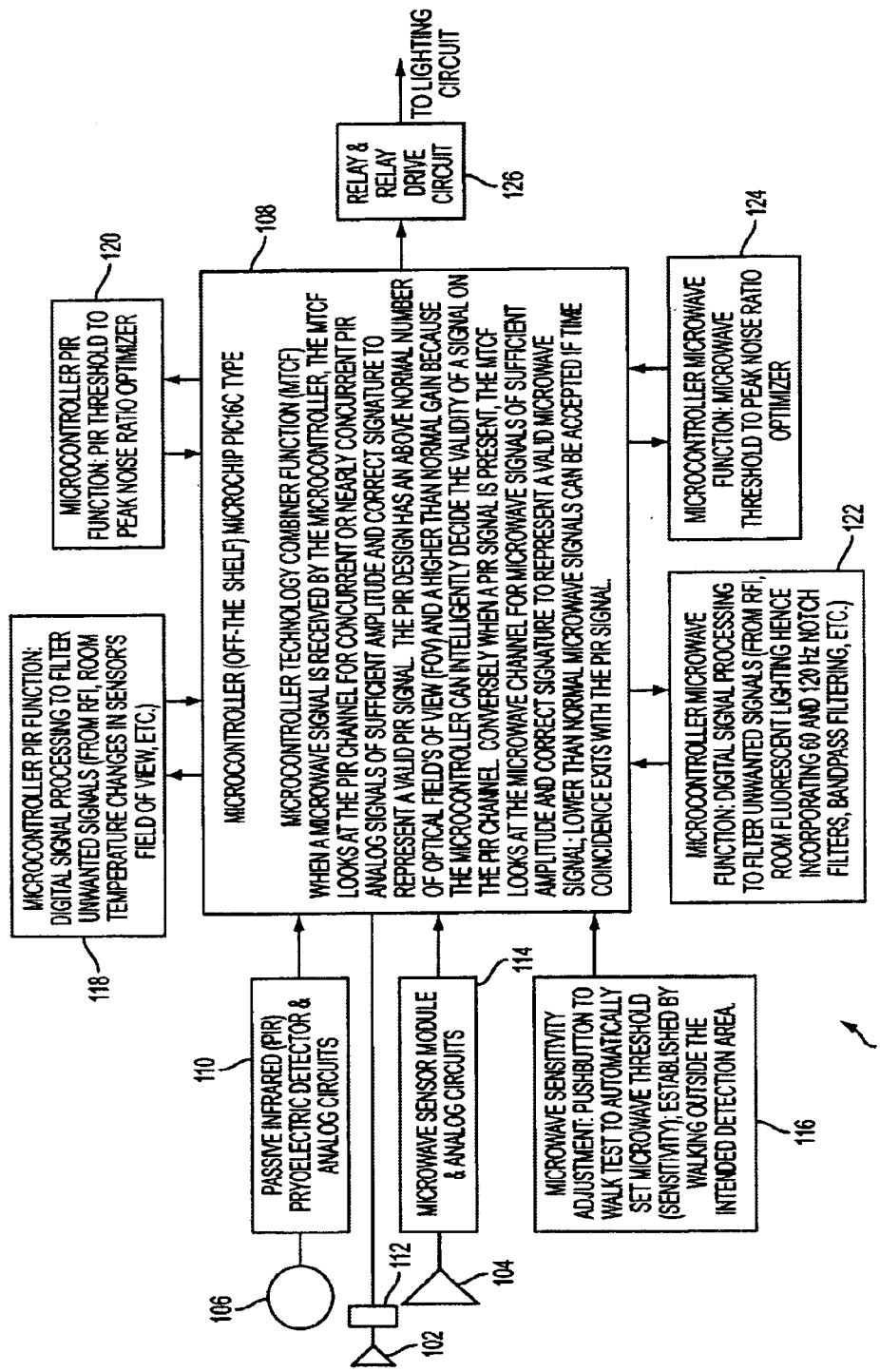
FIG. 1 is a conceptual block diagram of a dual technology motion or occupancy sensor according to an embodiment of the present invention.

FIG. 1 is a functional block diagram of a dual technology sensor 100 according to an embodiment of the present invention. The dual technology sensor 100 employs a microwave emitter 102 and a microwave sensor 104 in conjunction with a passive infrared (PIR) pryoelectric sensor 106 to function as a reliable occupancy sensor.

As described in more detail below, the sensor 100 includes a microcontroller 108, such as a PIC16C microcontroller or the like, that processes signals representative of the microwave and infrared energy detected by the microwave sensor 104 and PIR sensor 106, respectively, to determine occupancy of a monitored area. The PIR sensor 106 in this example includes an above normal number of optical fields of view (FOV) and a higher than normal gain because microcontroller 108 can intelligently decide the validity of a signal received on its input channel dedicated to the PIR sensor 106. That is, a typical wall mounted PIR sensor will have one layer of fields of view. However, the PIR sensor 106 employed in sensor 100 will have multiple layers of fields of view. Also, the microcontroller 108 and its associated circuitry can intelligently extract signals from noise using various types of signal processing techniques, such as digital filtering, pattern recognition, frequency component recognition and the like.

In this example, the PIR sensor 106 is coupled to analog circuitry 110 that provides analog signals to the microcontroller 108 in response to detection by the PIR sensor 106 of infrared energy emitted by an object of interest, such as a person, in the monitored area. Furthermore, the microwave emitter 102 is driven by drive circuitry 112 that is coupled to and controlled by the microcontroller 108 to drive the microwave emitter 102 to emit microwave energy into the monitored area. The microcontroller 108 can control the drive circuitry 112 to drive the microwave emitter 102 to emit microwave energy either continuously or in pulses each having a duration of one or several milliseconds. The microwave sensor 104 is coupled to analog circuitry 114 that provides analog signal to the microcontroller 108 in response to detection by the microwave sensor 104 of any microwave energy emitted by the microwave emitter 102 that has reflected off of an object of interest, such as a person, in the monitored area. That is, when the microwave emitter 102 is operating in either the continuous or pulsed mode described above, the microwave sensor 104 will detect the Doppler signals reflected off the object of interest.

As further shown in FIG. 1, sensor 100 includes a microwave sensitivity adjustment circuit 116 that is coupled to microcontroller 108 and is operable to adjust the sensitivity of the microwave detection features of the microcontroller 108 as described in more detail below. Microcontroller 108 also includes a PIR digital signal processing component 118, a PIR threshold to peak noise ratio optimizer component 120, a microwave digital signal processing component 122, and a microwave threshold to peak noise ratio optimizer component 124, the purposes and operations of which are described in more detail below. In addition, microcontroller 108 is coupled to a relay and relay drive circuit 126 to control switching of the relay to, for example, activate and deactivate a lighting circuit (not shown).

The operation of the sensor 100 will now be described with reference to FIG. 2.

With the release of the new NEMA WD 7-1999 Occupancy Motion Sensor Standard, it will become apparent that dual technology sensors, which operate so that either technology ("OR" logic) will keep the sensor load in an "on" state, can have significantly better maintained motion sensor patterns than sensors which employ only PIR technology. Concerning sensor 100, it is noted that the use of microwave and PIR technologies for energy management control, for example, as an occupancy sensor to activate and deactivate lights in a room during occupancy and unoccupancy, respectively, is somewhat different from the use of such technologies in a dual technology security sensor. For example, in a security sensor application, it is a goal to reduce the number of false alarms to zero, if possible. Hence, to minimize the occurrence of false alarms, the logic circuitry is configured as "AND" logic which requires that both technologies (e.g., PIR and microwave technologies) must detect a degree of motion sufficient to produce signals exceeding their individual alarm thresholds, or which satisfy signal signature comparison criteria, before the security sensor provides an alarm output.

On the contrary, false activations of energy management sensors need not be zero, but simply should be kept low as low as possible, and particularly never above a level where they are discernible by, or a problem for, the user. Typically in these types of applications, it is a more significant problem if the sensor deactivates the lights in the monitored area when the monitored area is still occupied. For these reasons, the dual technology energy management sensor 100 will typically activate the relay and relay drive circuit 126 to initially activate (i.e., upon the first detected motion) the lighting circuit when both technologies indicate the presence of an object which produces signals exceeding their individual alarm thresholds. It is noted that instead of comparing the signals to threshold levels, other signal evaluation techniques can be used, such as signal signature comparison techniques or other digital signal processing techniques, to determine whether the signals represent the presence of an object. However, as discussed in more detail below, to prevent premature deactivation of the lighting circuit when the monitored area is still occupied, the microcontroller 108 in sensor 100 will reset its delay timer to zero when either technology ('OR' logic) detects motion which produces a signal exceeding the alarm threshold for that technology (or, for example, meeting the signal signature comparison criteria), thus maintaining the lighting circuit in an active state to keep the lights on.

The above conditions can be grouped into three categories, namely, initial trigger motion detection, maintained mode of operation, and deactivation when monitored area becomes unoccupied. The initial trigger motion detection operation will first be discussed.

When the microcontroller 108 is controlling the relay and relay drive circuit 126 to maintain the lighting circuit in an inactive (off) state, the microcontroller 108 monitors the signals provided by the PIR detection analog circuitry 110 and microwave detection analog circuitry 114 and compares those signals to respective threshold values or signal signatures. The PIR threshold to peak noise ratio optimizer component 120 and the microwave threshold to peak noise ratio optimizer component 124 of microcontroller 108 adjust the threshold to peak noise ratios ($T/N_{pk}$) for the detected PIR energy and microwave energy, respectively, to provide more accurate threshold comparisons and thus more optimum performance. Thus, the microwave and PIR technologies can each have microcontroller determined ($T/N_{pk}$) which are optimized for the type of application in which the sensor 100 is employed.

Moreover, as discussed above, instead of using threshold techniques, the microcontroller 108 and its associated circuitry can employ signal signature comparison techniques, or other digital signal processing techniques, to evaluate the signals to determine whether the signals representing the PIR energy and microwave energy have characteristics representative of motion detection. For example, microcontroller 108 can be configured to evaluate and reject signals with rise times slower or faster than specified values. Microwave Doppler signals can also be intelligently processed using frequency discrimination to reject false microwave detection signals. Further details of these types of signal processing techniques that can be performed by microcontroller 108 and its related circuitry and can thus be employed in sensor 100 are described in U.S. Pat. No. 6,151,529 to Thomas J. Batko, the entire contents of which being incorporated herein by reference.

When the microcontroller 108 determines that the level of signals provided by PIR detection analog circuitry 110 are greater than their respective threshold level and the signal signature is correct to represent a valid a PIR signal, microcontroller 108 determines that the PIR sensor 106 has sensed the presence of an object of interest in the occupied area, which can be referred to as a "PIR trip" condition. Likewise, when the microcontroller 108 determines that the level of signals provided by microwave detection analog circuitry 114 are greater than their respective threshold level and the signal signature is correct to represent a valid microwave signal, microcontroller 108 determines that the microwave sensor 104 has sensed the presence of an object of interest in the occupied area, which can be referred to as a "microwave trip" condition.

As discussed briefly above, microcontroller 108 performs an "AND" logic comparison of the detection result from the PIR sensor signals and the detection result from the microwave sensor signals to determine whether to switch the relay and relay drive circuit 126 to activate the lighting circuit. That is, as shown in FIG. 2, if the signals provided from analog circuitry 110 indicate that the PIR sensor 106 has detected PIR energy in the occupied area but the signals provided from analog circuitry 114 indicate that the microwave sensor 104 has not detected a sufficient level of reflected microwave signals, or vice versa, controller 108 will maintain the relay and relay drive circuit 126 in the "inactive" state that therefore maintains the lighting circuit in an inactive state. The lights in the monitored area therefore remain off.

However, when microcontroller 108 determines that the signals provided from analog circuitry 110 indicate that the PIR sensor 106 has detected PIR energy in the occupied area, and signals provided from analog circuitry 114 concurrently or nearly concurrently with the signals from analog circuitry 110 indicate that the microwave sensor 104 has detected a sufficient level of reflected microwave signals, microcontroller 108 will start a delay timer to begin counting, and will control the relay drive circuit 126 to place the relay in the "active" state that therefore switches the lighting circuit to an active state and turns the lights in the monitored area "on". It is also noted that the microcontroller 108 can be configured to accept microwave sensor signals as indicative of motion or occupancy detection if they are in time coincidence or substantially in time coincidence with the PIR sensor signals indicating motion or occupancy detection.

When the microcontroller 108 is controlling the relay and relay drive circuit 126 to maintain the lighting circuit in an active (on) state, the microcontroller 108 monitors the signals provided by the PIR detection analog circuitry 110 and microwave detection analog circuitry 114 and compares those signals to respective threshold values. Alternatively, the microcontroller 108 and its related circuitry can evaluate the characteristics of the signals from the PIR detection analog circuitry 110 and microwave detection analog circuitry 114 using signal signature comparison techniques or other digital signal processing techniques as discussed above and as described in U.S. Pat. No. 6,151,529 referenced above. As discussed briefly above, microcontroller 108 performs an "OR" logic comparison of the detection result from the PIR sensor signals and the detection result from the microwave sensor signals to determine whether to keep the relay and relay drive circuit 126 activating the lighting circuit and to reset the delay time to zero.

Figure 2:
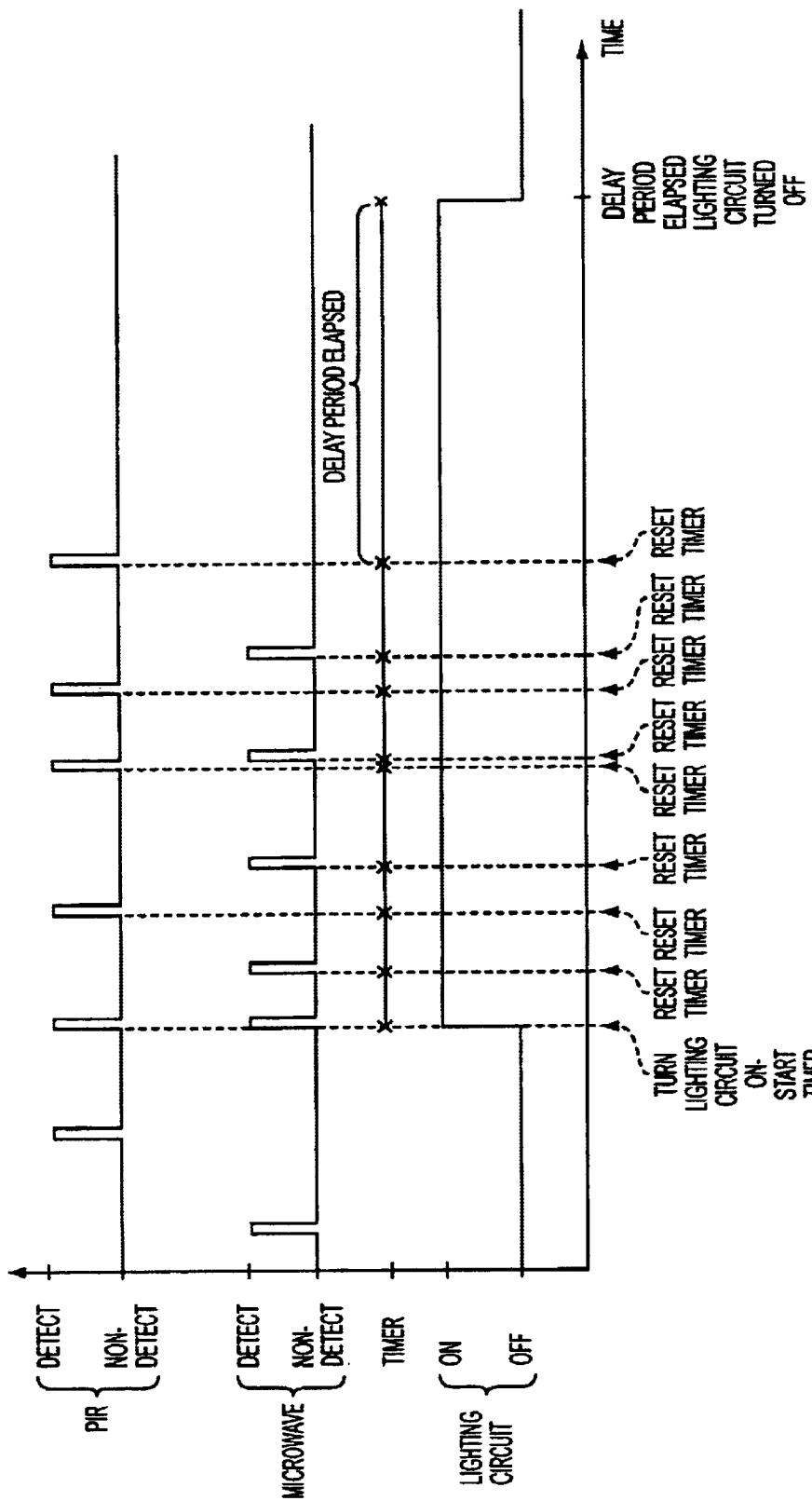
FIG. 2 is a graph showing an example of operation of a controller of the dual technology sensor shown in FIG. 1 in response to conditions of detection signals provided by the PIR sensor and microwave sensor of the dual technology sensor.

That is, as shown in FIG. 2, if the signals provided from analog circuitry 110 indicate that the PIR sensor 106 has detected PIR energy in the occupied area but the signals provided from analog circuitry 114 indicate that the microwave sensor 104 has not detected a sufficient level of reflected microwave signals, or vice versa, controller 108 will reset its delay timer to zero and start the delay timer to begin counting again, to maintain the relay and relay drive circuit 126 in the "active" state, which therefore maintains the lighting circuit in an active state. The lights in the monitored area thus remain on.

As further discussed briefly above, microcontroller 108 performs an "AND" logic comparison of the detection result from the PIR sensor signals and the detection result from the microwave sensor signals to determine whether to switch the relay and relay drive circuit 126 to deactivate the lighting circuit. That is, as shown in FIG. 2, if the signals provided from analog circuitry 110 indicate that the PIR sensor 106 has detected insufficient PIR energy in the occupied area and the signals provided from analog circuitry 114 indicate that the microwave sensor 104 has not detected a sufficient level of reflected microwave signals, microcontroller 108 will begin operation to control the relay drive circuit 126 to switch the relay back to the "inactive" state that therefore places the lighting circuit in an inactive state. Typically, microcontroller 108 will use its delay timer to set a delay period (e.g., from 15 to 30 minutes, or any other suitable delay period) from the time at which microcontroller 108 determines based on the signals provided by analog circuitry 110 and 114 that the monitored area is unoccupied (i.e., the time that the microcontroller 108 last receive a signal indicating occupancy from either analog circuitry 110 or analog circuitry 114 as shown in FIG. 2) until the time that the microcontroller 108 controls the relay drive circuit 126 to deactivate the lighting circuit (i.e., after the delay period has elapsed). The sensor 100 can include a switch (not shown) to adjust the delay period as desired.

The lights in the monitored area therefore will be switched off after this delay period has elapsed, provided that the microcontroller 108 does not determine that occupancy has been detected by the microwave sensor 104 or PIR sensor 106. That is, as discussed above and shown in FIG. 2, if at any time during this delay period analog circuitry 110 or 114 provides signals having a level sufficient to indicate detection of occupancy by the microwave sensor 104, PIR sensor 106, or both, the microcontroller 108 will reset the delay period to zero, begin counting the delay period again, and continue to control the relay drive circuit 126 to maintain the lighting circuit in an active state, as shown in FIG. 2. In this event, the lights will remain on.

It is noted that motion of persons outside the room containing the sensor 100, as well as water running in plastic pipes located in the detection pattern, can cause reflection of the microwave signals and thus detection of those reflected signals by the microwave sensor 104. In this event, analog circuitry 114 would provide detection signals to the microcontroller 108, which can be of a sufficient level to be interpreted by the microcontroller 108 as indicating occupancy in the monitored area, even though the monitored area is vacant. To avoid these types of false occupancy indications, the microwave detection sensitivity should therefore be adjusted based on, for example, the size of the occupied area.

However, because the aspect ratio of the microwave pattern is fixed, sensitivity generally cannot be optimally adjusted for all rooms which have a variety of different aspect ratios. Installation procedures thus typically require "walk testing" to check for excessive microwave sensitivity. For example, the installer can press a test button (not shown) on the microwave sensitivity adjustment circuit 116 to place the sensor 100 in a test mode, so that the installer can walk where he or she does not want his or her motion or presence to cause a false occupancy indication. When the test button is pressed, the microcontroller 108 can allow an exit time followed by a fixed (or adjustable) walk test time for the installer to walk outside the monitored area. During this test mode, the microcontroller 108 automatically adjusts the level of sensitivity at which the microcontroller 108 will interpret microwave detection signals from the analog circuitry 114 as indicating occupancy in the monitored area. For example, the microcontroller 108 can adjust (e.g., increase) the threshold to which the microwave detection signals are compared, so that any signals having a level less than the adjusted threshold will be interpreted by the microcontroller 108 as indicative of non-occupancy. It is further noted that this sensitivity adjustment will also reduce the amount of false activation of the lighting circuit caused by motion outside the monitored area.

The microcontroller 108 can also be configured to time control the potential microwave "trip" signals (i.e., signals that have sufficient energy to cause a trip) to reduce false occupancy detection that may from time to time occur due to the types of activities described above, such as motion outside the occupied area and so on, even after the above installation and sensitivity adjustment process has been performed. This is especially important during the delay period when the microcontroller 108 has detected that the monitored area is vacant, and is waiting for the delay period to elapse without an occupancy detection so that the microcontroller 108 can control the relay control circuit 126 to deactivate the lighting circuit.

Microcontroller 108 could therefore be configured to increase the threshold to peak noise ratio ($T/N_{pk}$) during the first part (e.g., the first 50%) of the delay period. Hence, the threshold to which the microwave detection signals provided by analog circuitry 114 are compared is made higher during this first half of the delay period than during the second half of the delay period. The level of the microwave detection signals needed to cause the microcontroller 108 to indicate occupancy is thus greater during this first half of the delay period than during the second half of the delay period. Accordingly, this reduces the likelihood that an erroneous occupancy detection will occur due to microwave signal detection during the delay period. Types of signal processing techniques and adaptive timing techniques are described in U.S. Pat. No. 6,151,529 referenced above, as well as in U.S. Pat. Nos. 5,699,243 and 5,640,143, the entire contents of each of these patents being incorporated herein by reference.

The accuracy of sensor 100 can further be improved in other ways. For example, as discussed above, when microcontroller 108 determines that the monitored area is occupied due to maintained motion or occupancy in the monitored area, microcontroller 108 maintains the lighting circuit in an activated state. As can be appreciated by one skilled in the art, when sensor 100 is used as a motion sensor for a security system, microcontroller 108 would not operate in this maintained motion mode, but rather, would provide an alarm at the instant motion is detected and not deactivate the alarm even if the monitored area becomes unoccupied. When used as a lighting control circuit, however, microcontroller 108 can be configured to accept or reject microwave Doppler information or, in other words, intelligently process microwave signals using frequency discrimination techniques to reject false trip signals.

For example, Doppler signal frequencies from a person walking at normal velocities comprise a spectrum of frequencies which can be bandpass filtered digitally or by using analog techniques. A microchip, such as an AN616 microchip PIC microcontroller for digital signal processing (DSP), can be adapted to microcontroller 108 and microwave digital signal processing component 122 to provide a 120 Hz notch filter, 60 Hz notch filter, or both, to notch filter signals which can cause false microwave trips, such as radio frequency interference (RFI), fluorescent lighting signals (e.g., 60 Hz and 120 Hz signals), and so on. DSP provides much sharper bandpass (notch) filtering than analog filters. Also, microcontroller 108 can be configured to require more cycles of Doppler per "burst" and/or more "bursts" of Doppler before recognizing the detected microwave signals as a valid indication of occupancy. Likewise, PIR digital signal processing component 118 can filter unwanted signals caused by RFI, room temperature changes in the field of view of the PIR sensor 106, and so on, to improve accuracy.

In addition, acceptable PIR signals and microwave signals from moving people can be mapped and the results stored in a memory (not shown) associated with the microcontroller 108. The microcontroller 108 can be configured to compare these stored mapped signals to newly sensed signals, and to reject those signals which do not meet comparison criteria. Also, a history of the ratio of microwave trips to PIR trips can be stored in the memory associated with microcontroller 108. Microcontroller 108 can be configured to recognize when the ratio of microwave trips to PIR trips is excessively high or low, and can thus compensate for the manner in which microwave trips are recognized as valid trip signals. In other words, microcontroller 108 can be adjusted to require a certain number of microwave trips per each PIR trip before recognizing occupancy of the monitored area.

Microcontroller 108 can be configured to include any combination of the configurations described above for reducing false trips. Alternatively, microcontroller 108 can be configured to require detection of motion or occupancy by the microwave sensor 104 and by the PIR sensor 106 to maintain the lighting circuit in the active state. In this type of arrangement, the microcontroller 108 thus performs an "AND" logic comparison of the detection result from the PIR sensor signals and the detection result from the microwave sensor signals to determine whether to continue to control the relay drive circuit 126 to maintain the lighting circuit in the active state to keep the lights in the monitored area on.

That is, if the signals provided from analog circuitry 110 indicate that the PIR sensor 106 has detected PIR energy in the occupied area but the signals provided from analog circuitry 114 indicate that the microwave sensor 104 has not detected a sufficient level of reflected microwave signals, or vice versa, microcontroller 108 will begin timing out the delay period. Unless during the delay period the microwave sensor signals and the PIR sensor signals indicate detection of motion or occupancy, microcontroller 108 will control the relay drive circuit 126 to drive the relay to place the in lighting circuit in the "inactive" state once the delay period has elapsed. The lights will therefore be shut off at the end of the delay period. However, if the technology (PIR or microwave) failing to detect motion or occupancy begins to detection motion or occupancy reasonably coincident with the other technology before the delay period has elapsed, the microcontroller 108 will reset its delay timer to zero and thus maintain the lighting circuit in an active state to keep the lights on. This arrangement allows for the sensitivities of the PIR and microwave technologies to be increased to greater than initial trigger mode levels to provide a larger area of coverage without sacrificing low false trip performance.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A sensor, adapted to control a drive circuit for driving a lighting circuit configured to illuminate an area monitored by the sensor, comprising:

an infrared energy sensor, adapted to output an infrared energy detection signal indicative of detection or non-detection of infrared energy;

a microwave energy sensor, adapted to output a pulsed microwave energy detection signal indicative of detection or non-detection of microwave energy;

a test button, adapted to place the sensor in a test mode for a predetermined time period to allow a tester to define a boundary of the area to be monitored by the microwave energy sensor by walking along the perimeter of the area to be monitored; and a controller, adapted to automatically adjust a sensitivity level for detecting the pulsed microwave energy detection signals during the test mode, said controller, being further adapted to output a control signal to control said drive circuit to control activation and deactivation of said lighting circuit in response to a condition of said infrared energy detection signal and a condition of said pulsed microwave energy detection signal.

2. A sensor as claimed in claim 1, wherein:

said infrared energy sensor outputs said infrared energy detection signal having a first condition representative of detection of said infrared energy, and outputs said infrared energy detection signal having a second condition representative of non-detection of said infrared energy; and said microwave energy sensor outputs said pulsed microwave energy detection signal having a first condition representative of detection of said microwave energy, and outputs said pulsed microwave energy detection signal having a second condition representative of non-detection of said microwave energy.

3. A sensor as claimed in claim 2, wherein:

when said controller is outputting said control signal having an activation condition to maintain said lighting circuit in an active state, said controller is adapted to change said control signal to a deactivation condition to deactivate said lighting circuit in response to said infrared energy detection signal having said second condition, or said pulsed microwave energy detection signal having said second condition, for a predetermined duration of time.

4. A sensor as claimed in 3, wherein:

when either said infrared energy detection signal or said pulsed microwave energy detection signal fails to maintain its respective said second condition for said predetermined duration of time, said controller is adapted to maintain said control signal in said activation condition to maintain said lighting circuit in said active state.

5. A sensor as claimed in claim 2, wherein:
when said controller is outputting said control signal having a deactivation condition to maintain said lighting circuit in an inactive state, said controller is adapted to change said control signal to an activation condition to activate said lighting circuit in response to said infrared energy detection signal having said first condition and said pulsed microwave energy detection signal having said first condition.

6. A sensor as claimed in claim 2, wherein:
when said controller is outputting said control signal having an activation condition to maintain said lighting circuit in an active state, said controller is adapted to maintain said control signal in said activation condition to maintain activation of said lighting circuit in response to said infrared energy detection signal having said first condition and said pulsed microwave energy detection signal having said second condition, or vice versa.

7. A sensor as claimed in claim 2, wherein:
when said controller is outputting said control signal having an activation condition to maintain said lighting circuit in an active state, said controller is adapted to change said control signal to a deactivation condition to deactivate said lighting circuit in response to said infrared energy detection signal having said second condition, and said pulsed microwave energy detection signal having said second condition, for a predetermined duration of time.

8. A sensor as claimed in claim 7, wherein:
when either said infrared energy detection signal or said pulsed microwave energy detection signal fails to maintain its respective said second condition for said predetermined duration of time, said controller is adapted to maintain said control signal in said activation condition to maintain said lighting circuit in said active state.

9. A sensor as claimed in claim 1, wherein:
said controller is adapted to compare a magnitude of said pulsed microwave energy detection signal to a microwave detection threshold to determine detection or non-detection of microwave energy, and is adapted to compare a magnitude of said infrared energy detection signal to an infrared detection threshold to determine detection or non-detection of infrared energy.

10. A sensor as claimed in claim 9, wherein:
said controller is adapted to adjust at least one of a magnitude of said pulsed microwave detection threshold and a magnitude of said infrared detection threshold.

11. A sensor as claimed in claim 1, wherein:
said drive circuit includes a relay drive for driving a relay that activates and deactivates said lighting circuit; and
said controller is adapted to output said control signal to control said relay drive.

12. A sensor as claimed in claim 1, wherein:
said area includes a room; and
said controller is adapted to output said control signal to control said drive circuit to control activation and deactivation of said lighting circuit to selectively provide light to said room in response to a condition of said infrared energy detection signal and a condition of said pulsed microwave energy detection signal.

13. A method for controlling a drive circuit for driving a lighting circuit configured to illuminate an area monitored by a sensor, comprising:

placing the sensor in a test mode for a predetermined time period to allow a tester to define a boundary of the area to be monitored by a microwave energy sensor by walking along the perimeter of the area to be monitored;
selectively adjusting a sensitivity level for detecting microwave energy detection signals during the test mode;
detecting for infrared energy in said monitored area and providing an infrared energy detection signal indicative of detection or non-detection of said infrared energy;
detecting for pulsed microwave energy in said monitored area and providing a microwave energy detection signal indicative of detection or non-detection of said microwave energy; and
controlling activation and deactivation of said drive circuit to control activation and deactivation of said lighting circuit in response to a condition of said infrared energy detection signal and a condition of said pulsed microwave energy detection signal.

14. A method as claimed in claim 13, wherein:
said infrared energy detecting step provides said infrared energy detection signal having a first condition representative of detection of said infrared energy, and outputs said infrared energy detection signal having a second condition representative of non-detection of said infrared energy; and
said microwave energy detecting step provides said pulsed microwave energy detection signal having a first condition representative of detection of said microwave energy, and outputs said pulsed microwave energy detection signal having a second condition representative of non-detection of said microwave energy.

15. A method as claimed in claim 14, wherein:
when said controlling step is maintaining said lighting circuit in an active state, deactivating said lighting circuit when said infrared energy detection signal has said second condition, or said pulsed microwave energy detection signal has said second condition, for a predetermined duration of time.

16. A method as claimed in claim 15, wherein:
when either said infrared energy detection signal or said pulsed microwave energy detection signal fails to maintain its respective said second condition for said predetermined duration of time, maintaining said lighting circuit in said active state.

17. A method as claimed in claim 14, wherein:
when said controlling step is maintaining said lighting circuit in an inactive state, activating said lighting circuit when said infrared energy detection signal has said first condition and said pulsed microwave energy detection signal has said first condition.

18. A method as claimed in claim 14, wherein:
when said controlling step is maintaining said lighting circuit in an active state, maintaining activation of said lighting circuit when said infrared energy detection signal having said first condition and said pulsed microwave energy detection signal has said second condition, or vice versa.

19. A method as claimed in claim 14, wherein:
when said controlling step is maintaining said lighting circuit in an active state, deactivating said lighting circuit when said infrared energy detection signal has said second condition, and said pulsed microwave energy detection signal has said second condition, for a predetermined duration of time.

20. A method as claimed in claim 19, wherein:

when either said infrared energy detection signal or said pulsed microwave energy detection signal fails to maintain its respective said second condition for said predetermined duration of time, maintaining said lighting circuit in said active state.

21. A method as claimed in claim 13, wherein:

said controlling step compares a magnitude of said pulsed microwave energy detection signal to a microwave detection threshold to determine detection or non-detection of microwave energy, and compares a magnitude of said infrared energy detection signal to an infrared detection threshold to determine detection or non-detection of infrared energy.

22. A method as claimed in claim 21, further comprising:

adjusting at least one of a magnitude of said microwave detection threshold and a magnitude of said infrared detection threshold.

23. A method as claimed in claim 13, wherein:

said drive circuit includes a relay drive for driving a relay that activates and deactivates said lighting circuit; and said controlling controls said relay drive.

24. A method as claimed in claim 13, wherein:

said area includes a room; and said controlling controls said drive circuit to control activation and deactivation of said lighting circuit to selectively provide light to said room in response to a condition of said infrared energy detection signal and a condition of said pulsed microwave energy detection signal.

\* \* \* \* \*